(12) United States Patent
Leurs

(10) Patent No.: US 11,305,725 B2
(45) Date of Patent: Apr. 19, 2022

(54) QUICK RELEASE BUCKLE

(71) Applicant: Joseph Howard Leurs, Adams, TN (US)

(72) Inventor: Joseph Howard Leurs, Adams, TN (US)

(73) Assignee: Joseph H. Leurs, Adams, TN (US)

( * ) Notice: Subject to any disclaimer, the term of this patent is extended or adjusted under 35 U.S.C. 154(b) by 120 days.

(21) Appl. No.: 16/527,020

(22) Filed: Jul. 31, 2019

(65) Prior Publication Data
US 2021/0031721 A1   Feb. 4, 2021

(51) Int. Cl.
*B60R 22/04* (2006.01)
*B60R 22/48* (2006.01)

(52) U.S. Cl.
CPC .............. *B60R 22/04* (2013.01); *B60R 22/48* (2013.01); *B60R 2022/4808* (2013.01)

(58) Field of Classification Search
CPC .. B60R 22/04; B60R 22/48; B60R 2022/4808
USPC ............... 701/45; 24/603, 633; 180/268–270
See application file for complete search history.

(56) References Cited

U.S. PATENT DOCUMENTS

| | | | | |
|---|---|---|---|---|
| 3,863,209 A * | 1/1975 | Hollins | .................... | B60R 22/48 180/270 |
| 5,520,263 A * | 5/1996 | Suran | .................... | B60R 22/343 180/270 |
| 6,806,810 B2 * | 10/2004 | Robinson | ................ | B60R 22/48 180/269 |
| 7,178,208 B2 * | 2/2007 | Bentsen | ............. | A44B 11/2503 24/303 |
| 7,869,921 B2 * | 1/2011 | Bolton | .................... | B60R 22/44 701/45 |
| 8,590,935 B1 * | 11/2013 | Leedy | .................... | B60R 22/321 280/808 |
| 8,751,105 B2 * | 6/2014 | Whelan | ............. | B60W 50/0098 701/36 |
| 2006/0080812 A1 * | 4/2006 | O'Brien | ................. | A44B 11/25 24/633 |
| 2012/0279794 A1 * | 11/2012 | Clayton | ................ | B60R 22/321 180/269 |
| 2014/0336879 A1 * | 11/2014 | Kwon | .................... | B60R 22/34 701/45 |

\* cited by examiner

*Primary Examiner* — Joshua E Rodden
(74) *Attorney, Agent, or Firm* — Joseph H. Leurs

(57) ABSTRACT

Quick Release Buckle (QRB) is an automated seatbelt system. QRB utilizes a power source and control unit software incorporated into pre-existing components within the vehicle's transmission or by micro-switch. QRB automatically disengages the seatbelt upon placing the vehicle in "park", regardless of the ignition setting for law enforcement/military vehicles. While in "park", an electrical signal energizes a solenoid releasing the buckle. The control unit contains proprietary software that records every engage/disengage of the seatbelt. Electronic records can be downloaded at any time, using an integrated micro-scan disk (SD) module/card. During a collision, the system ceases to record activity, showing electronic proof the seatbelt was engaged/disengaged. Civilian application includes accident investigations, insurance inquiries, and private company regulation compliance. Civilian QRB differs slightly as the transmission must be placed in "park" and the ignition must be in "off" for system operation.

13 Claims, 5 Drawing Sheets

QUICK RELEASE BUCKLE

A computer program listing explaining operation of the invention of the current disclosure is provided at the end this specification.

BACKGROUND OF INVENTION

The Quick Release Buckle (QRB) is designed to automatically disengage from a standard vehicle seatbelt which is controlled by proprietary software and operated through the use of the vehicle's automatic transmission commonly found in most law enforcement and civilian vehicles.

All vehicles manufactured by United States standards, to include—civilian, law enforcement, and military are standardly equipped with an analog seat belt. A standard seat belt consists of at least two parts; a latching mechanism and a latching tongue. These parts are attached to a nylon belt which is then secured to the frame of any vehicle. When worn properly, a person is secured to the seat of the vehicle via the seat belt, seat, and vehicle frame.

(Law Enforcement)

Law enforcement and other emergency vehicles are often involved in vehicle pursuits, collisions, and similar situations which require the first responder to exit their vehicle in an expeditious manner. In many cases, the seat belt is viewed as a hindrance due to the cumbersome nature of the device. In addition, the critical time it takes to manually disengage the buckle while remaining focused on the immediate task at hand can be detrimental. Although most if not all police departments across the United States require their officers to utilize the seat belt, many choose not to for the aforementioned reasons. Such decisions create a significant risk to the officer as well as the public in which they serve. An officer is no good to the public if he/she does not arrive safely.

When an officer or first responder chooses not to utilize the seat belt, he/she is usually subjected to administrative disciplinary action. Failing to abide by legal and departmental policies opens the door for liability should a collision occur.

A law enforcement officer is required to wear a duty belt around the waist which consists of numerous items such as; a firearm, radio, batons, handcuffs, extra ammunition, tasers, pepper spray, and audio recorders. Proper utilization of a seat belt can be significantly hindered by this cumbersome equipment. Officers routinely feel their movement is restricted while in the driver seat of a police vehicle. This poses a significant risk during high stress scenarios where the human body's naturally experiences the loss of fine motor skills and/or tunnel vision.

Previous prototypical devices similar to QRB, consist of mechanisms that are manually controlled and require the vehicle ignition to be in the "off" position and the key removed from the ignition. Such a sequence is not practical in today's police and first responder environment. Others have been designed to disengage in the event of a collision which poses a risk to the occupant as in many cases the occupant is safer remaining restrained until help arrives.

There is a clear need for a seat belt system such as QRB. Understanding how the human body reacts under stress is a critical component to the QRB and will allow the operator to simply place the transmission into the "park" position while the buckle operates as it was designed. In the event the buckle does not perform as intended, the officer will still be able to disengage manually. Furthermore, QRB is equipped with a micro-scan disk module along with the card (memory capacity is dependent on user preference). QRB recommends at least an eight-gigabyte card for this application which will be able to provide a detailed report of when and for ow long the seatbelt wan engaged/disengaged. This will provide definitive proof that the officer (driver) is or is not adhering to established departmental policies and state laws. The QRB will undoubtably increase the efficiency and effectiveness of those who protect us while also holding them to a new standard of accountability.

(Civilian)

QRB has multiple civilian applications. During all vehicle collision investigations conducted by the police the use of the seat belt is a crucial factor. Each state has its own way of tracking such statistics. However, most (if not all) do in some fashion. As the aforementioned stated; the QRB system will produce irrefutable proof that a restraint was in use at the time if the collision, thus providing concrete data for state statistical purposes.

The number of vehicles on the roadway in the United States is positively correlated to the number of vehicle collisions reported each year. Insurance fraud is common, and many policies become void in the event the driver or occupants are not properly restrained. By failing to utilize the seat belt, more injuries are likely to occur, thus creating higher insurance premiums.

Private corporations and federal organizations such as Federal Express (FedEx), United Parcel Service (UPS), United States Postal Service (USPS) have policies requiring the use of seat belts. The QRB is designed to hold such employees accountable in an effort to mitigate liability.

In addition to the local law enforcement and first responder communities the need for a QRB system exists in private and other government agencies.

The QRB is a seatbelt system designed to release automatically when a vehicle transmission is placed into the "park" position. The law enforcement design does not require the vehicle ignition to be in the off position, nor does the key need to be removed from the ignition. In contrast—the civilian design requires the transmission to place in "park" and the ignition must be in the "off" position.

The QRB design requires a physical mechanism to release the seat belt buckle. Engineering of this mechanism was not necessary due to its compatibility with commercial-off-the-shelf (COTS) parts. This cost saving aspect to both the customer and potential investors of the QRB makes the design more economically be eliminating the need to research and develop original parts. This also allows for expedited production and ease of implementation since the design has a working prototype to show proof of concept.

The QRB is designed to fit in any pre-manufactured buckle-housing unit. Again, for the ease of implementation to a future buyer, it was important to ensure that any additional parts required in the operation of the QRB fit into any automaker's existing seat belt restraint design.

BRIEF DESCRIPTION OF THE DRAWINGS

FIG. 9 represents a CAD drawing of an internal view of the buckle, modified with a pull cable both to the release button and securely mounted to the arm and (bottom view) the opposite end of the pull cable is then attached to the solenoid for actuation.

DETAILED DESCRIPTION

Figure 1:
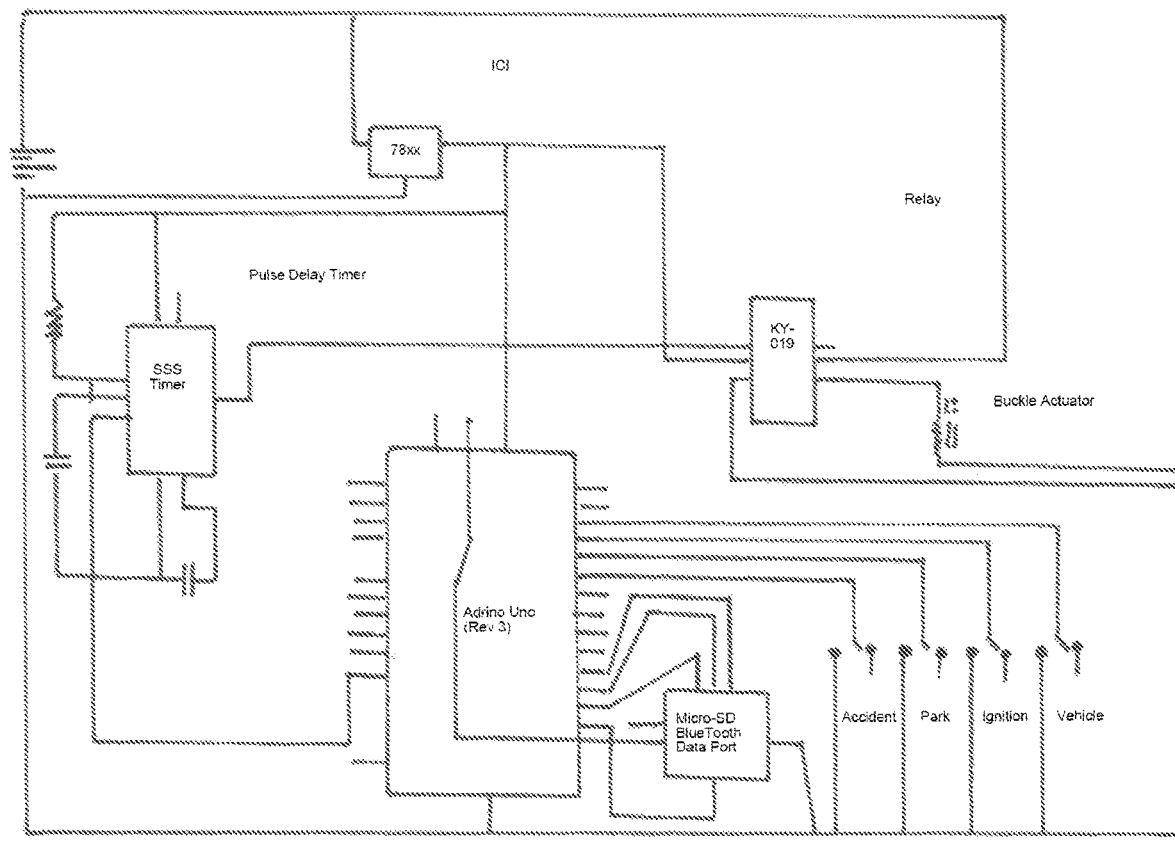
FIG. 1—Circuit Design of the QRB system.
Figure 2:
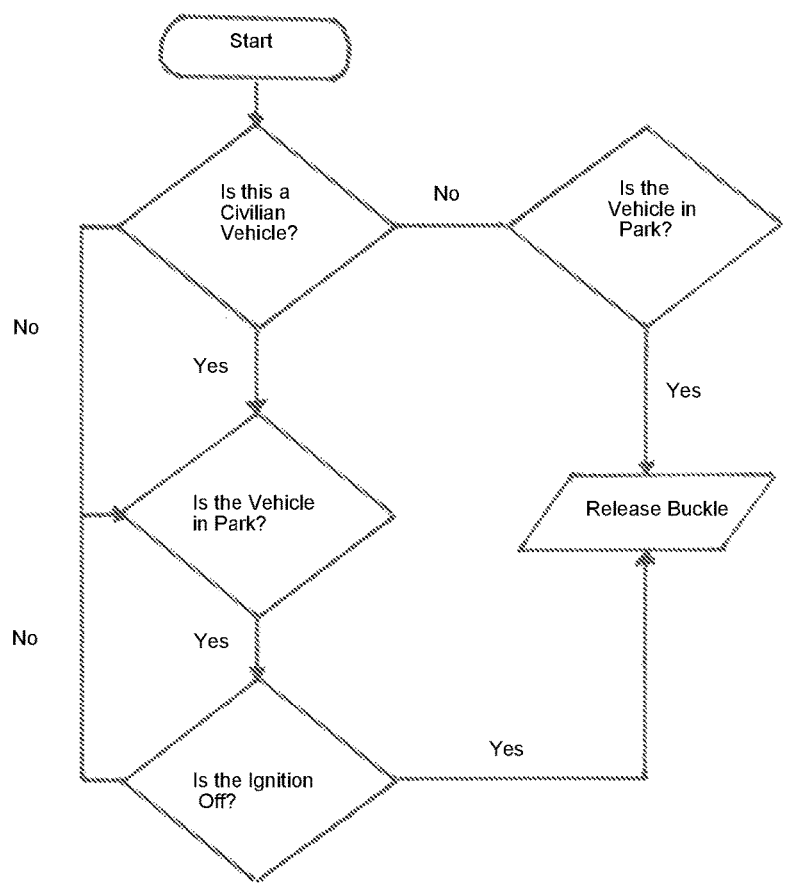
FIG. 2—Physical Circuit depicts the actuator controlling the buckle that is controlled by a five-volt relay receiving control signals and the input voltage (Vin) pin of the Arduino MCU. The negative output of the 12-volt power supply was connected to negative wire of the actuator and the ground (GND) pin of the Arduino MCU. The positive wire of the actuator was connected to the normally open output pin of the relay. The five-volt relay's input pins were the input voltage pin (VCC), signal input (IN), and ground (GND). The VCC pin was connected to the five-volt output pin of the Arduino MCU. The IN pin was connected to a digital pin of the Arduino MCU to receive signals. The GND pin of the relay was connected to the ground of the Arduino MCU. Three switches were connected to digital pins of the Arduino MCU. The three switches were tied together at one end to ground and used the Arduino MCU's onboard pullup resistances. This method was used to eliminate the need for connected to a 32-kilobyte memory chip. The memory chip was connected to the five-volt and GND pins of the Arduino MCU physical resistors.

For a clear and better understanding of the QRB; reference and description with accompanying:

Circuit Design—FIG. 1 contains the circuit design of the QRB system. The Physical Circuit—FIG. 2 depicts the solenoid controlling the buckle that is controlled by a five-volt relay receiving control signals from an Arduino (microcontroller unit) MCU. The relay was selected to switch power on or off to the buckle depending on the conditions of the vehicle. The positive output of the 12-volt power supply was connected to the common output pin of the relay and the input voltage (Vin) pin of the Arduino MCU. The negative output of the 12-volt power supply was connected to negative wire of the actuator and the ground (GND) pin of the Arduino MCU. The positive wire of the actuator was connected to the normally open output pin of the relay.

The five-volt relay's input pins were the input voltage pin (VCC), signal input (IN), and ground (GND). The VCC pin was connected to the five-volt output pin of the Arduino MCU. The IN pin was connected to a digital pin of the Arduino MCU to receive signals. The GND pin of the relay was connected to the ground of the Arduino MCU. Three switches were connected to digital pins of the Arduino MCU. The three switches were tied together at one end to ground and used the Arduino MCU's onboard pullup resistances. This method was used to eliminate the need for connected to a 32-kilobyte memory chip. The memory chip was connected to the five-volt and GND pins of the Arduino MCU physical resistors and reduce number of wires.

Figure 3:
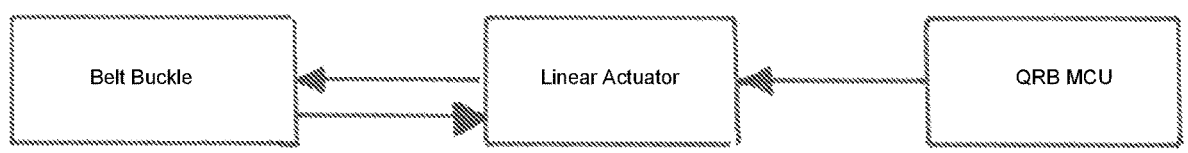
FIG. 3—Logic Code flowchart of how the QRB operates. The first decision is whether or not the car is a law enforcement or civilian vehicle. If the car is a law enforcement vehicle, the MCU checks if the car is in "park". If the car is in park, then the buckle is released. If the car is a civilian vehicle, the MCU checks if the car is in "park" or not. If the car is in park, the MCU checks if the ignition is on or not. If the ignition is off, then the buckle is released. QRB contains a data logging system that records a value of 255 to the next memory address whenever a pulse is recorded. This simulates recording the belt unbuckling using the vehicle's real-time clock. The current design also records a value of 127 to the next memory address once the buckle resets to simulate recording the time that the buckled was re-engaged. When the memory is full, the values are overwritten starting at the initial location. The code also allows for a fourth switch to be added that simulates an accident. If an accident occurs, the event is logged, and the memory is software-locked to prevent tampering.

Logic Code—FIG. 3 represents the logic flowchart of how the QRB operates. The first decision is whether or not the car is a law enforcement or civilian vehicle. If the car is a law enforcement vehicle, the MCU checks if the car is in "park". If the car is in park, then the buckle is released. If the car is a civilian vehicle, the MCU checks if the car is in "park" or not. If the car is in park, the MCU checks if the ignition is on or not. If the ignition is off, then the buckle is released. QRB contains a data logging system that records a value of 255 to the next memory address whenever a pulse is recorded. This simulates recording the belt unbuckling using the vehicle's real-time clock. The current design also records a value of 127 to the next memory address once the buckle resets to simulate recording the time that the buckled was re-engaged. When the memory is full, the values are overwritten starting at the initial location. The code also allows for a fourth switch to be added that simulates an accident. If an accident occurs, the event is logged, and the memory is software-locked to prevent tampering.

Figure 4:
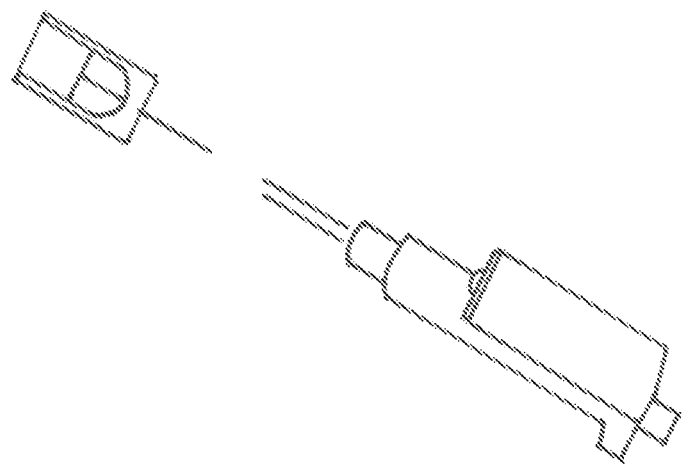
FIG. 4—Buckle Release Design is the method which the process of releasing the QRB with the Arduino MCU. Once the decision is made by the Arduino MCU to release the belt buckle, a 12-volt solenoid actuator is pulse activated wherein a cable attached between the actuator and buckle slider is configured to be pulled as the actuator compresses electromagnetically. The cable will then move the buckle slider from the locked to the unlocked position releasing the buckle tongue. Once the action is initiated, the actuator will decompress as the 12-volt pulse is over returning the buckle slider back to the original position.

Buckle Release Design—FIG. 4 is the method which the process of releasing the QRB with the Arduino MCU. Once the decision is made by the Arduino MCU to release the belt buckle, a 12-volt solenoid is pulse activated wherein a cable attached between the solenoid and buckle slider is configured to be pulled as the solenoid compresses electromagnetically. The cable will then move the buckle slider from the locked to the unlocked position releasing the buckle tongue. Once the action is initiated, the solenoid will decompress as the 12-volt pulse is over returning the buckle slider back to the original position.

Most automakers outsource the design and construction of personal safety restraint systems to third party vendors; therefore, the design was created using a seat belt assembly from a Ford Taurus which was easily sourced. The intent of the QRB is to be easily implemented in any vehicle that is used by LEOs, the choice of which seat belt assembly was chosen was not a crucial element.

An important element in the design is selecting a mechanism to be able to pull the seat belt release slide with enough force to release the seat belt buckle. The average release button for a seat belt needs to be depressed one-half inch and requires 3 lbf (pounds of force) to release the buckle. An important aspect that was considered when looking at options was for the mechanism to use enough force to operate the seat belt assembly but not so forceful as to cause damage to the buckle release mechanism or the QRB. Since it was important to find easily sources parts, a 12-volt solenoid was chosen. The solenoid has a one-inch stroke and pulls with at least five (5) pounds of force which is strong enough to effectively accomplish releasing the buckle.

Figure 5:
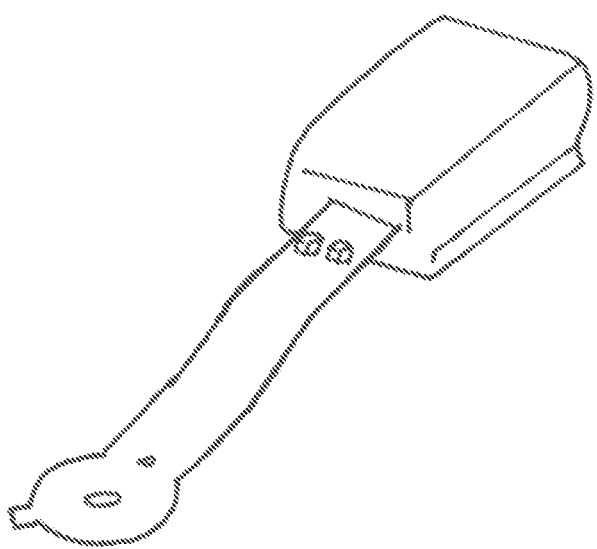
FIG. 5 represents a Computer Aided Design (CAD) drawing of the buckle along with a solenoid depicting the pulling action of the system during disengagement.
Figure 6:
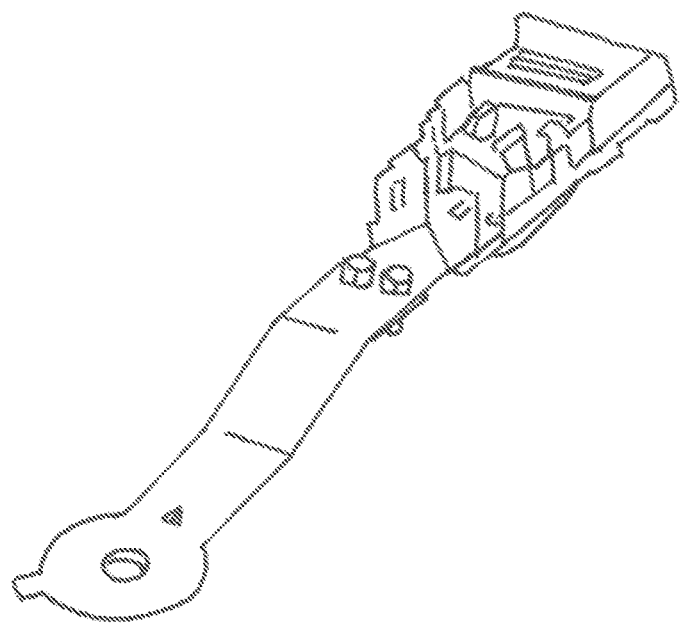
FIG. 6 represents a standard seatbelt buckle and mounting arm CAD drawing, modified with a pull cable mount (top view) the pull to the solenoid for actuation.
Figure 7:
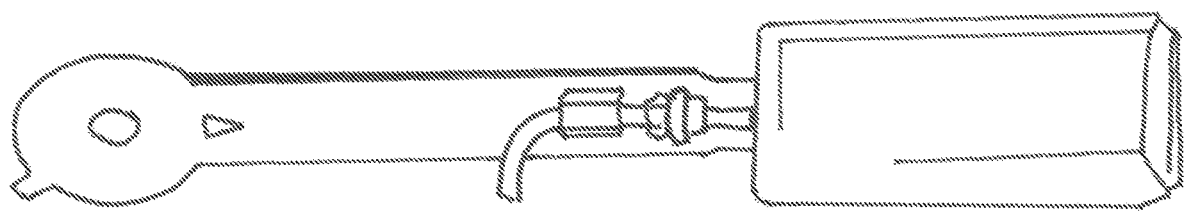
FIG. 7 represents a Computer Aided Design (CAD) drawing of the buckle.
Figure 8:
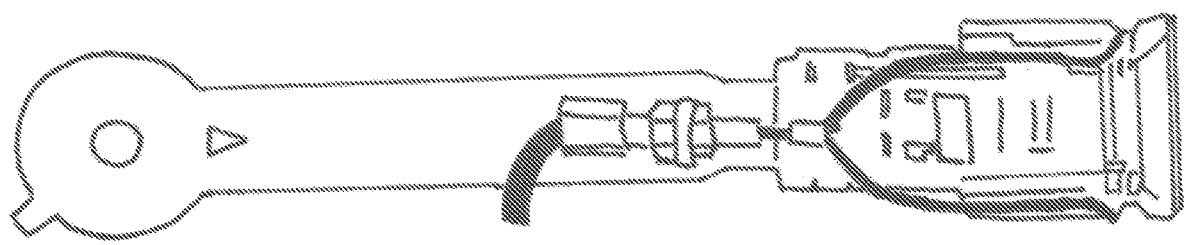
FIG. 8 represents a standard seatbelt buckle CAD drawing modified with the pull cable mounted securely to the buckle arm, (bottom view) the opposite end of the pull cable is then attached to the solenoid for actuation.

To connect to buckle release slide to the actuator there was a couple of factors to consider. One factor is the cable has the flexibility to be capable of being incorporated into the design of the buckle release and existing wiring. The second factor is the cable needing to be strong to handle the force releasing the buckle and rigid enough to allow the solenoid actuator to pull the cable allowing the buckle slide release. A brake cable was chosen for both strength and dexterity since its design is meant to be robust enough to repeatedly pull the release slide without breaking yet be flexible enough to follow the sensor wiring and car frame cable restraints. FIG. 5 represents a Computer Aided Design (CAD) drawing of the buckle.

Quick Release Buckle Logic Proprietary Code

```
// Include libraries needed for FRAM chip
#include <Wir.h>
#include "Adafmit_FRAM_I2C.h"
// Initialize the FRAM chip object for read and write manipulation
Adafmit_FRAM_I2C fram=Adafmit_FRAM_I2C( );
uint6 t framAddr=0;
// Define the pins on the Arduino MCU
#define ACCIDENT_SWITCH 2 // Button that simulates an accident, locking the memory chip until reset
#define VEHICLE SWITCH 3 // Controls whether operating in law enforcement or civilian vehicle
#define IGNITION SWITCH 4 // Controls whether the car is on or not (only applies to civilian vehicle)
#define PARK SWITCH 5 // Controls whether the car is in park or not
#define RAM LOCK 6 // Locks the memory as soon as an accident is detected
#define RELEASE PIN 7 // The pin that sends the release signal to the buckle
#define BOARD LED 13 // On board LED to indicate accident
#define ACCIDENT ID 0xFF // Constant to indicate recording an accident
// How long the pulse lasts in milliseconds
#define PULSE TIME 200
// The different state variables based on the switches
int vehicleState; // Is the car in law enforcement mode or civilian mode
in ignitionState; // Is the car on or not (only applies to civilian vehicle)
in parkState; // Is the car in park or not
int accidentState; // Is there an accident detected
int previousAccidentState; // Save the initial state of the ACCIDENT_SWITCH to know when it was detected
int previousParkState; // Was the car previously in park or not (to ensure the buckle can be latched again)
int previousignitionState; // Was the car's ignition previously on or not (for civilian vehicle)
int buckleReleased; // Check if the buckle was released or not for data logging purposes
// Tracker to know what address to write to on each pulse
uint8_t addrCoun;
// This code initializes pins
void setup( ) {
    // Setup serial communications (for debugging only)
    Serial.begin(115200);
    // Initialize the FRAM object
    if (fram.begin( )) {
    Serial.println("Found I2C FRAM");
    }
    else (
    Serial.pritln("I2C FRAM not identified . . . check connections\r\n");
    Serial.pritln("Will continue in case this processor doesn't support repeated start\r\n");
    }
    // Get the address tracker value
    addrCount=fram.read8(0x0);
    // Setup pins using internal pullup resistors on the MCU
    pinMode(ACCIDENT_SWITCH, INPUT_PULLUP); // Accident simulator
    pinMode(VEHICLE_SWITCH, INPUT_PULLUP); // Read vehicle state: LOW-Civilian, HIGH-Law enforcement
    pinMode(IGNITION_SWITCH, INPUT_PULLUP); // Read ignition state: Civilian vehicle only, LOW is off
    pinMode(PARK_SWITCH, INPUT_PULLUP); // Read park state: HIGH represents in park
    pinMode(RELEASE_PIN, OUTPUT); // Set release pin high to release buckle
    pinMode(RAM_LOCK, OUTPUT); // Pin to lock RAM when accident is detected
    pinMode(BOARD_LED, OUTPUT); // On-board LED indicating RAM is locked
    digitalWrite(RAM_LOCK, LOW); // Allow RAM to be written to
    digitalWrite(RELEASE_PIN, HIGH); // Initialize relay to off
    previousParkState=HIGH; // Set the state of park to HIGH or OFF (based on circuitry) initially
    previousignitionState=LOW; // Set the state of park to LOW or ON (based on circuitry) initially
    buckleReleased=LOW; // Set the state of buckle released to be LOW or FALSE initially
    previousAccidentState=digitalRead(ACCIDENT_SWITCH);
}
// This code continuously runs and contains the control logic
void loop( ) {
    // Read the states of the four switches
    accidentState=digitalRead(ACCIDENT_SWITCH);
    vehicleState=digitadRead(VEHICLE_SWITCH);
    ignitionState=digitalRead(IGNITION_SWITCH);
    parkState=digitalRead(PARK_SWITCH);
    // If accident switch is flipped, write to memory that an accident was detected, lock the software
    If (accidentState !=previousAccidentState) {
    memWrite(ACCIDENT_ID); // Write accident to memory
    digitalWrite(BOARD_LED, HIGH);
    digitalWrite(RAM_LOCK, HIGH); // Lock the RAM
    Serial.println("Accident Detected"); //Debugging
    while (1) {
    }
    }
    // If the car is in law enforcement mode, placed in park, and the car was not previously in park, release the buckle
    if (!vehicleState && !parkState && previousParkState) {
    releaseBuckle( );
    }
    // If the car is in civilian mode, placed in park, ignition is off, and the car was not previously in park, release the buckle
    else If (vehicleState && ignitionState && !parkState && !previousIgnitionState) {
```

```
    releaseBuckle( );
}
// The new previous state will be the current state
    previousParkState=parkState;
    previousIgnitionState=ignitionState;
// Prints out the states of the switches. For debugging
purposes only
    Serial.print("Vehicle Switch is:"); Serial.println(vehicleState);
    Serial.print("Ignition Switch is:"); Serial.println(ignitionState);
    Serial.print("Park Switch is:"); Serial.println(parkState);
    Serial.print("Previous park state was:"); Serial.println
(previousParkState);
    Serial.println( );
    Serial.println( );
    Serial.println( );
// delay(2500); //Debugging
}
// Function for writing the pulse signal to the next address of
memory
void memWrite(int pulse) {
    // Go to the next address
    addrCount++;
    // If the RAM is full, go back to the first address and write
to it
    If (addrCount==32768) {
    addrCount=0;
    }
    // Write the next address to be written to in the first address
    fram.write8(0x0, addrCount);
    // Write to memory that an accident occurred If detected
    If (accidentState !=previousAccidentState) {
    Serial.prinln("Recorded accident . . . ");
    fram.writeS(addrCount, 0x46); // Write hex 'F' to current
        memory location
    addrCount++; // Move to next memory location
    fram.write8(addrCount, 0x75); // Write hex 'u' to current
        memory location
    addrCount++; // Move to next memory location
    fram.write8(addrCount, 0x63); // Write hex c to current
        memory location
    addrCount++; // Move to next memory location
    fram.writeS(addrCount, 0x6b); // Write hex 'k' to current
        memory location
    fram.write8(0x0, addrCount); // Write current memory
        location to the first byte to keep track
    return;
    }
    if (pulse) {
// Write #FF in hexadecimal to indicate buckle disengagement to the current address
fram.writeS(addrCount, 255);
    }
    else {
// Write #7F in hexadecimal to indicate buckle re-engagement to the current address
fram.write8(addrCount, 127);
    }
}
// This function releases the buckle when the proper conditions are met
void releaseBuckle( ) {
    digitalWrite(RELEASE_PIN, LOW); // Send pulse to release the buckle
    buckleReleased=HIGH; // Buckle was released
    memWrite(buckleReleased); // Write to memory that the buckle was released
    Serial.println("Release buckle"); // Debugging
    delay(PULSE_TIME); // Do nothing to ensure proper unbuckling
    digitalWrite(RELEASE_PIN, HIGH); // Re-engage the buckle
    buckleReleased=LOW; // Buckle was re-engaged
    memWrite(buckleReleased); // Write to memory that the buckle was re-engaged
```

The invention claimed is:

1. A quick release buckle system comprising:
At least one seat belt buckle for use in a vehicle, the seat belt buckle including a latching mechanism and a latching tongue;
A micro control unit connected to the seat belt buckle and configured to be connected to a transmission, electrical system of the vehicle or switch, the micro control unit configured to perform the following steps:
  a. Determine whether the vehicle is a law enforcement vehicle or a civilian vehicle;
  b. Upon determining that the vehicle is the law enforcement vehicle, configuring the seat belt buckle to release the latching mechanism when the vehicle is placed in a park position, and an ignition of the law enforcement vehicle is in one of the on or off position as set by an operator of the vehicle; and
  c. Upon deterring that the vehicle is the civilian vehicle, configuring the seat belt buckle to release the latching mechanism when the vehicle is placed in the park position and an ignition of the civilian vehicle is in the off position;
the seat belt buckle is configured to additionally contain manual releasing capability.

2. The seat belt buckle system of claim 1, wherein the at least one seat belt buckle is configured to be attached to one of a front seat or a rear seat of the vehicle.

3. The seat belt buckle system of claim 1, wherein the at least one seat belt buckle is a plurality of seat belt buckles, the plurality of seat belt buckles each being configured to be attached to one of a front seat or a rear seat of the vehicle.

4. The seat belt buckle system of claim 3, wherein the plurality of seat belt buckles are configured individually to have the steps to be turned on and off by an operator of the vehicle.

5. The seat belt buckle system of claim 1, wherein the seat belt buckle is configured to have the steps to be turned on and off by an operator of the vehicle.

6. A law enforcement vehicle containing the seat belt buckle system of claim 1, upon recognizing the law enforcement vehicle, the seat belt buckle is configured to release the latching mechanism when the vehicle is placed in a park position, and an ignition of the law enforcement vehicle is in one of the on or off position as set by the operator of the vehicle.

7. A civilian vehicle containing the seat belt buckle system of claim 1, upon recognizing the civilian vehicle, the seat belt buckle is configured to release the latching mechanism when the vehicle is placed in the park position and an ignition of the civilian vehicle is in the off position.

8. The seat belt buckle system of claim 1, wherein the seat belt buckle is configured to record each operation of the seat belt buckle, these operations being configured to be downloaded when necessary, using a removable Micro Scan Disk, Universal Serial Bus, Bluetooth, On-board Diagnostics, or Direct Data Port.

9. The law enforcement vehicle of claim 6, wherein the seat belt buckle is configured to record each operation of the seat belt buckle, these operations being configured to be downloaded when necessary, using a removable Micro Scan Disk, Universal Serial Bus, Bluetooth, On-board Diagnostics, or Direct Data Port.

10. The civilian vehicle of claim 7, wherein the seat belt buckle is configured to record each operation of the seat belt buckle, these operations being configured to be downloaded when necessary, using a removable Micro Scan Disk, Universal Serial Bus, Bluetooth, On-board Diagnostics, or Direct Data Port.

11. The law enforcement vehicle of claim 6, further comprising an override button located near a driver door instrument cluster to allow first responders to disengage the seat belt buckle system in an event of an accident or other emergency situation.

12. The civilian vehicle of claim 7, further comprising an override button located near a driver door instrument cluster to allow first responders to disengage the seat belt buckle system in an event of an accident or other emergency situation.

13. The seat belt buckle system of claim 1, further comprising the latching mechanism including a buckle slider, pull cable and a solenoid for attaching the latching mechanism to the latching tongue.

\* \* \* \* \*